United States Patent [19]

Isono et al.

[11] 4,153,911
[45] May 8, 1979

[54] COLOR CORRECTION CIRCUIT FOR A COLOR TELEVISION RECEIVER

[75] Inventors: Katsuo Isono, Kawagoe; Seiji Sanada, Yokosuka, both of Japan

[73] Assignee: Sony Corporation, Tokyo, Japan

[21] Appl. No.: 839,847

[22] Filed: Oct. 6, 1977

[30] Foreign Application Priority Data

Oct. 6, 1976 [JP] Japan .................. 51-120102

[51] Int. Cl.² ............. H04N 9/62; H04N 9/535
[52] U.S. Cl. ............................. 358/10; 358/27; 358/28
[58] Field of Search .............. 358/10, 27, 28

[56] References Cited

U.S. PATENT DOCUMENTS

| | | | |
|---|---|---|---|
| 3,673,320 | 6/1972 | Carnt et al. | 358/10 X |
| 3,950,780 | 4/1976 | Freestone | 358/28 |
| 4,059,838 | 11/1977 | Banker et al. | 358/27 |

Primary Examiner—Richard Murray
Attorney, Agent, or Firm—Lewis H. Eslinger; Alvin Sinderbrand

[57] ABSTRACT

A color correction circuit responsive to a VIR signal that includes a clamping circuit to clamp a color demodulated signal to a predetermined voltage level during the chrominance reference portion of the VIR signal. A sample-and-hold circuit samples the luminance reference portion of the VIR signal immediately succeeding the clamped portion and holds the sampled value, and a comparator compares the sampled signal with the predetermined clamping voltage to generate an error-correction voltage that can be applied to a gain-control amplifier in the chrominance channel to correct saturation and to a phase-control circuit to adjust the hue by shifting the phase of the locally generated subcarrier.

9 Claims, 17 Drawing Figures

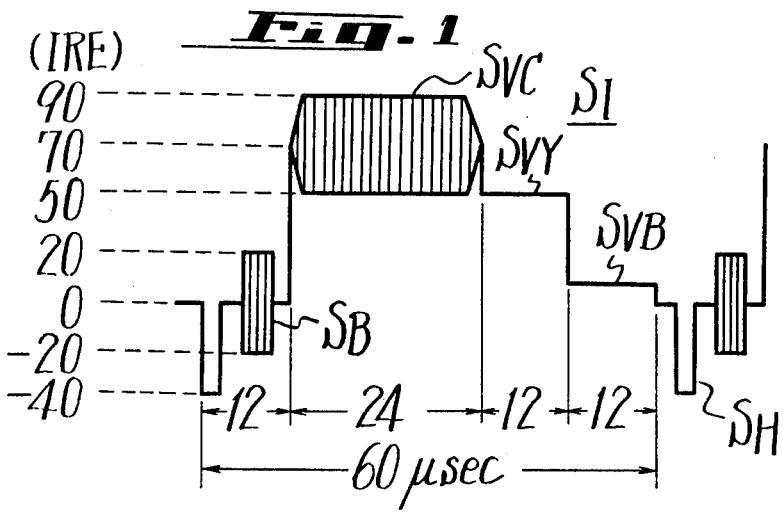
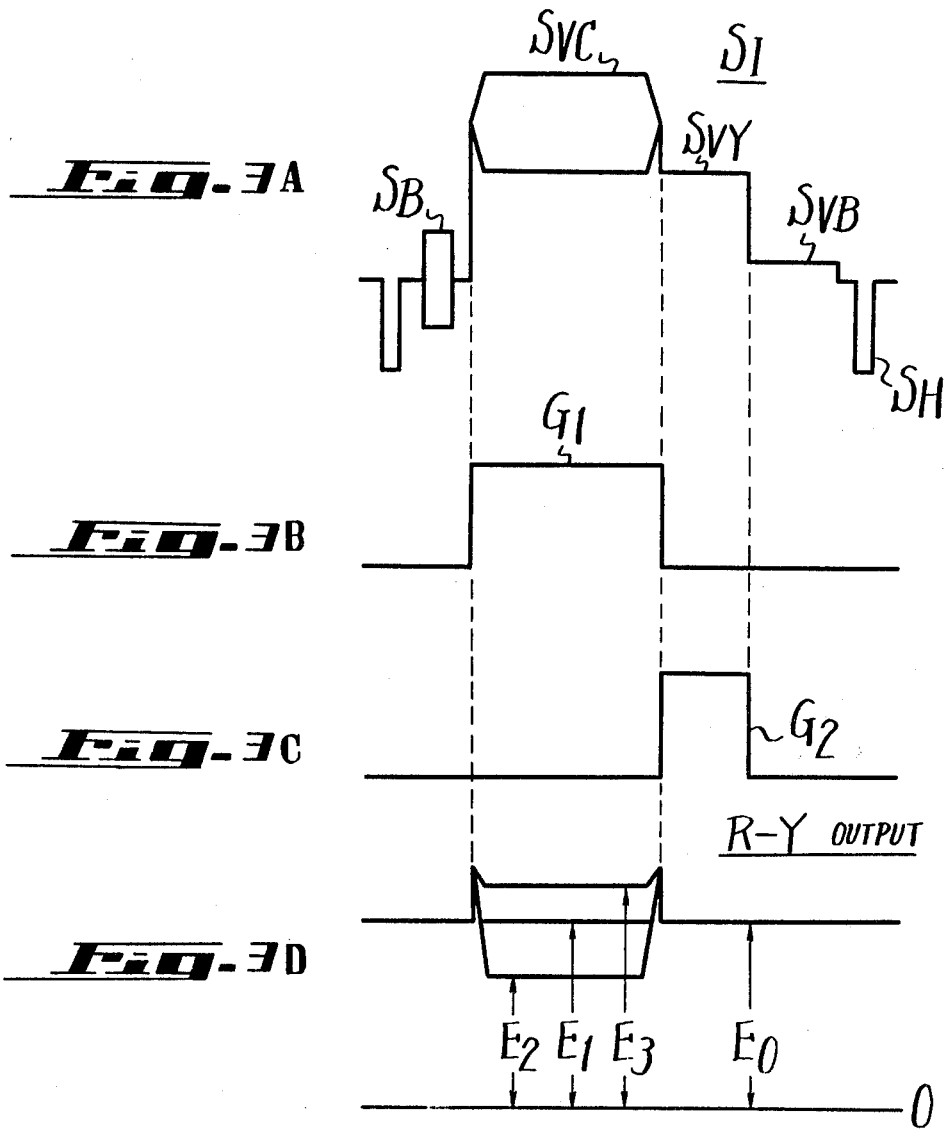

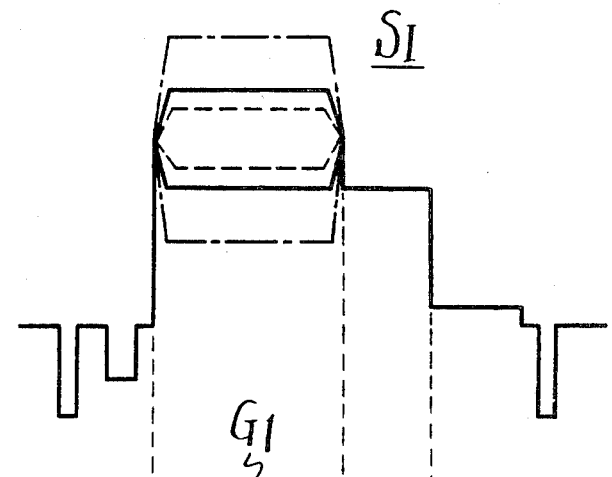
Fig. 7A
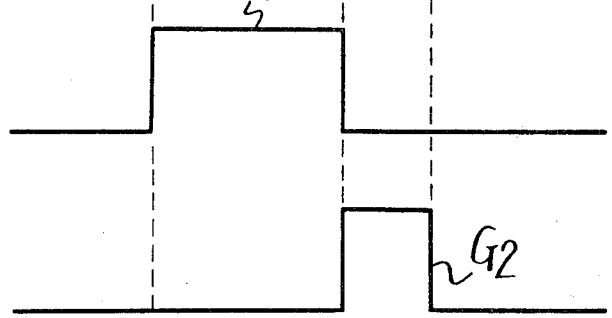
Fig. 7B
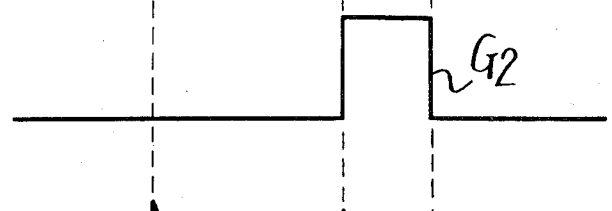
Fig. 7C
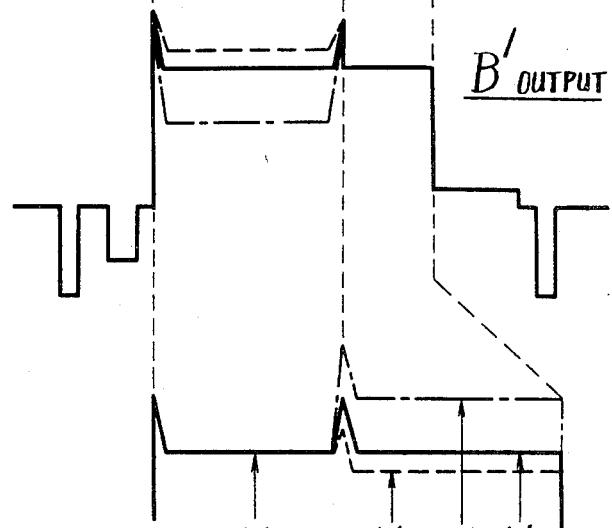
Fig. 7D
Fig. 7E

COLOR CORRECTION CIRCUIT FOR A COLOR TELEVISION RECEIVER

BACKGROUND OF THE INVENTION

1. Field of the Invention

The present invention relates to a color television receiver color correction circuit in which a vertical interval reference (VIR) signal is utilized to control a color level and/or hue.

2. Description of the Prior Art

In some prior art color television receivers, automatic adjustment of color saturation level or hue or both has been carried out by using a VIR signal which is part of the receiver signal. The VIR signal is an industry standard signal generated as part of a televison signal at a certain line interval during the vertical blanking interval. Although the VIR signal includes luminance and chrominance components that would be visible, they occur when the scanning beam of the picture tube is traversing a region that does not interfere with the picture being viewed.

The chrominance and luminance reference portions of the VIR signal have seen selected to correspond in amplitude to values that would be present during transmission of flesh tones of actors and actresses in the television picture. Viewers are aware of approximately what proper flesh tones should look like, while they may have no way of knowing the proper hue and saturation of other things in the picture.

U.S. Pat. No. 3,950,780 issued to Harry T. Freestone describes a prior art circuit for using a VIR signal to control hue and saturation. In that prior art circuit, the black reference level voltage is sampled and stored for comparison with a color reference signal. However, the color reference signal occurs at the beginning of each VIR signal line interval, and the black reference level voltage occurs at the end of the same line interval. As a result, the black reference level must be stored for almost a complete vertical interval. During that relatively long storage time the stored value may change, for example, due to leakage current, so that the comparison is inaccurate.

OBJECTS AND SUMMARY OF THE INVENTION

It is the object of this invention to provide a color correction circuit for a color television receiver to eliminate the above-described drawbacks and particularly to provide a simple circuit that does not require long storage times.

According to the main feature of this invention, a first pulse is used to clamp the level of a chrominance reference signal portion of a VIR signal, and the clamped output is compared with a luminance reference signal portion immediately following to the chrominance reference portion. The comparison is effected by use of a second pulse. The output, thus compared, is used to effect color correction.

The other objects, features and advantages of the present invention will be apparent from the following description taken in conjunction with the accompanying drawings.

BRIEF DESCRIPTION OF THE DRAWINGS

FIG. 1 shows the waveform of a VIR signal.

FIGS. 3A to 3D are waveform diagrams for explaining the hue adjusting operation of the circuit in FIG. 2.

FIGS. 7A to 7E are waveform diagrams used for explaining the operation of the color correction circuit of this invention.

DESCRIPTION OF THE PREFERRED EMBODIMENT

The VIR signal $S_I$ is an industry standard and is transmitted during the 19th line interval of each vertical blanking interval. It has the waveform shown in FIG. 1, which includes, in succession, a chrominance reference signal $S_{VC}$ inserted in a chrominance reference portion, a luminance reference signal $S_{VY}$ inserted in a luminance reference portion, and a black level reference signal $S_{VB}$. The waveform of the standard VIR signal is based on amplitude proportions in which the pedestal level is zero IRE units, the maximum white level is 100 IRE units, and the peak-to-peak amplitude of the burst signal $S_B$ is 40 IRE units.

The chrominance reference signal $S_{VC}$ is a sine wave signal having a frequency of 3.58 MHz, similar to the burst signal $S_B$, and has the same amplitude and phase as the burst signal. The signal $S_{VC}$ is superposed on a brightness level of 70 IRE, which corresponds approximately to the average flesh tone brightness amplitude. The standardized levels of the luminance reference signal $S_{VY}$ and the black reference signal $S_{VB}$ are 50 IRE units and 7.5 IRE units, respectively.

When a chrominance signal in the television picture as viewed is subjected to phase distortion, the chrominance reference signal $S_{VC}$ of the VIR signal $S_I$ is also subjected to phase distortion, and any phase shift in the chrominance reference signal $S_{VC}$ relative to the burst signal $S_B$ corresponds to the phase distortion of the chrominance signal in the flesh tone range. Accordingly, if the chrominance signal demodulation axis is controlled in accordance with this phase shift, the shift of hue due to phase distortion can be corrected centering about the average flesh tone. In addition, since the amplitude of the chrominance reference signal $S_{VC}$ corresponds to the level of the average flesh tone signal, the color saturation level can also be corrected centering about the average flesh tone by controlling the amplitude of the chrominance reference signal $S_{VC}$ so that it is constant.

Figure 2:
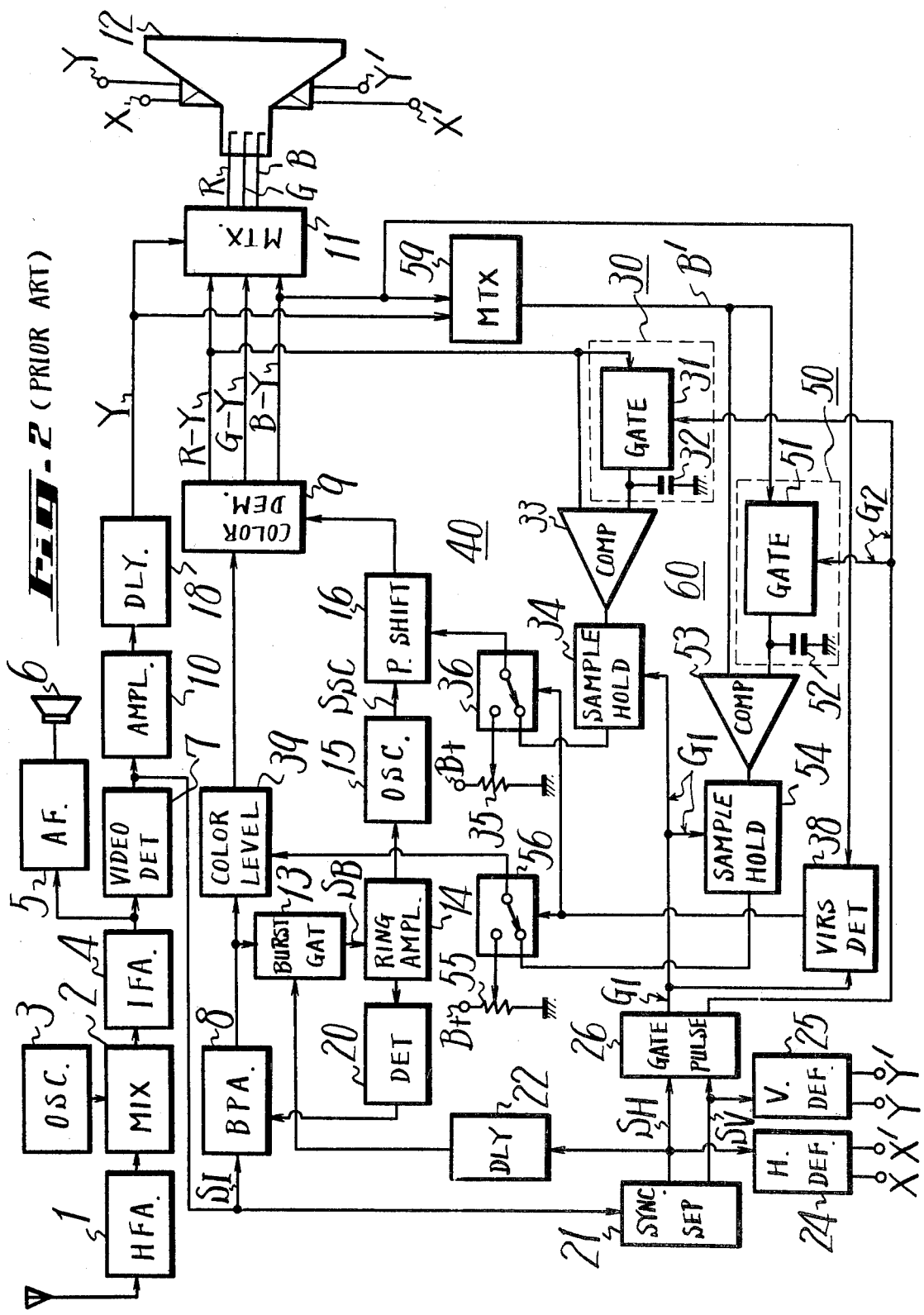
FIG. 2 is a block diagram of one example of a color television receiver including a prior art color correction circuit.

FIG. 2 shows one example of a prior art color television receiver having a color correction circuit in which a VIR signal is used to control both hue and color saturation. The color television receiver shown in FIG. 2 is similar to the receiver shown in U.S. Pat. No. 3,950,780. The receiver in FIG. 2 includes a high frequency amplifier 1, and mixer 2, a local oscillator 3, an intermediate frequency amplifier 4, an audio frequency signal circuit system 5, a loudspeaker 6, and a video detector circuit 7 for detecting a color video signal including the VIR signal $S_I$ shown in FIG. 1.

The detected output of the video detector 7 is supplied to a band pass amplifier 8 to pass only the chrominance signal to a color demodulator circuit 9 to demodulate color signals. These color signals are the customary color difference signals R-Y, G-Y, and B-Y, which are supplied to a matrix circuit 11 together with a luminance signal Y. The latter is obtained from an amplifier 10 connected to amplify the output signal of the video detector 7. The amplified luminance signal Y from the amplifier 10 is delayed by a delay circuit 18, and, when combined with the color difference signals in the matrix circuit 11, produces the primary color signals R, G and B, which are applied to a cathode ray tube 12.

The chrominance signal from the band pass amplifier 8 is also supplied to a burst signal gate circuit 13 that is gated to transmit only a burst signal $S_B$ to a ringing amplifier 14. The output of the latter is applied to an oscillator 15 to produce a continuous subcarrier signal $S_{SC}$ having a frequency of 3.58 MHz. The subcarrier signal $S_{SC}$ is passed through a phase shift control circuit 16, which will be described later, to the demodulator circuit 9. A chrominance signal level detector circuit 20 detects the presence of a signal in the ringing amplifier 14 and generates a signal to be applied to the band pass amplifier 8 for automatic color control operation.

The receiver also includes a synchronizing signal separator circuit 21 which separates out the horizontal synchronizing signal $S_H$ and the vertical synchronizing signal $S_V$. The horizontal synchronizing signal $S_H$ is delayed by a delay circuit 22 and then applied to the burst signal gate circuit 13 as its gating signal and to a horizontal deflection system 24 as its driving signal. Similarly, the vertical synchronizing signal $S_V$ is supplied to a vertical deflection system 25 as its driving signal.

The synchronizing signals $S_H$ and $S_V$ are further supplied to a gate pulse forming circuit 26 for forming first and second gate pulses $G_1$ and $G_2$ as shown in FIGS. 3B and 3C, respectively. These pulses produced only during the 19th line interval of the vertical period gate the VIR signal $S_I$. The first pulse $G_1$ is formed to be coincident with the chrominance reference portion, and the second pulse $G_2$ is formed to be coincident with the luminance reference portion which immediately succeeds the chrominance reference portion. Pulses that constitute the horizontal synchronizing signal $S_H$ are counted from the occurence of the vertical synchronizing signal $S_V$ to detect the horizontal interval in which the VIR signal $S_I$ occurs. Pulse forming circuits, including a mono-stable multivibrator and the like in the gate pulse forming circuit 26, are actuated by the above-detected output to produce the pulses $G_1$ and $G_2$.

A color correction circuit using the VIR signal $S_I$ will now be described. The adjustment of hue is achieved by detecting any phase shift of the chrominance signal $S_{VC}$ of the VIR signal $S_I$ relative to the burst signal $S_B$. Where there is no phase shift, the R-Y output is zero, but any shift in the phase of the chrominance reference signal $S_{VC}$ relative to the burst signal $S_B$ changes the R-Y output away from zero.

Meanwhile, the R-Y output during the luminance reference portion $S_{VY}$ is always zero because no chrominance signal is produced during that interval. Therefore, the R-Y output during the luminance reference portion corresponds to the R-Y output when there is no phase shift. In this example, the R-Y signal level during the luminance reference signal $S_{VY}$ interval is utilized for the zero reference level of the R-Y output. The reason for doing so will be described next.

As the zero reference level, a predetermined direct voltage level obtained by means of a resistor voltage divider or the like can be used. In this case, however, the variation of the direct voltage level due to variation of temperature and variation of the operation of the supply voltage source is normally not coincident with the variation of the demodulated output similarly due to variation of temperature and of the supply voltage source. Hence, the compared outputs between both levels cannot be used for accurate hue correction. Accordingly, in the example in FIG. 2, the R-Y output during the luminance reference signal $S_{VY}$, which varies according to the variation of demodulated output during chrominance reference signal $S_{VC}$ relative to temperature and supply voltage, is used as the zero reference level. A comparison is made with respect to color level correction.

A practical example of the prior art hue correction circuit 40 will now be described. In order to obtain a zero reference level, the R-Y output is supplied to a first holding circuit 30 which includes a first gate circuit 31 to gate the luminance reference signal portion $S_{VY}$ of the VIR signal $S_I$ by means of the second pulse $G_2$ derived from the circuit 26. The gated level during the luminance reference signal $S_{VY}$ is held in a capacitor 32 and is supplied as the zero reference output $E_O$ (refer to FIG. 3D) to a first comparator circuit 33. The R-Y output, itself, is also supplied to the same comparator so that the level of the R-Y output can be compared with the zero reference output $E_O$ to form a compared output signal that can be fed to a sample-and-hold circuit 34. Since the compared output signal required in this example is the R-Y output of the chrominance reference signal portion $S_{VC}$ relative to the reference output of the luminance reference signal portion $S_{VY}$ and the luminance reference $S_{VY}$ is preceded by the chrominance reference $S_{VC}$, the desired compared output is not obtained during the same vertical interval but appears after the lapse of one vertical interval (IV).

As shown in FIG. 3D, the R-Y output is obtained with a level of $E_1 (=E_0)$ if the phase difference between the chrominance reference signal $S_{VC}$ and the burst signal $S_B$ is zero, but if the phase difference is not zero, the output level is changed to $E_2$ or $E_3$ in accordance with whether the phase shift is positive or negative. The compared output is fed to the sample-and-hold circuit 34 by the first pulse $G_1$. The value of the output held by the circuit 34 is $E_0 - E_1 (=0)$, if there is no phase difference. If a phase difference does exist, the held value is either $E_0 - E_2$ or $E_0 - E_3$, according to the direction of phase shift.

The output of the sample-and-hold circuit 34 is supplied to the phase shift control circuit 16 to control the phase of the subcarrier signal. As a result, the demodulation axis of the subcarrier applied to demodulator circuit 9 is controlled so that the hue is corrected.

When a color video signal includes no VIR signal $S_I$, the automatic hue correction cannot be carried out. Instead, the circuit is automatically switched over by a switching circuit 36 to permit manual adjustment. The switching circuit is represented as if it were a single-pole double-throw switch, one fixed terminal of which is connected to the movable arm of a variable resistor 35 and the other fixed terminal of which is connected to the output of the sample-and-hold circuit 34. The conductive path through a switching circuit 36 is equivalent to the arm of a switch and is controlled by the detected output from the VIR signal detector circuit 38. The detector circuit 38 is supplied with, for example, the B-Y output signal and is controlled by the pulse $G_1$ to detect the presence of that signal during the VIR signal $S_I$. When VIR signal $S_I$ is present, the switching circuit 36 is in the condition illustrated. The detector circuit 38 may be supplied with the luminance signal Y instead of the B-Y signal and will still control the switching circuit.

The color saturation level can be adjusted by controlling the gain of a color level adjusting circuit 39, which is located ahead of the demodulator circuit 9, in accordance with the amplitude of the B-Y output. To this end, the B-Y output obtained at the demodulator circuit 9 may be supplied to a color level correction circuit 60, which is similar to the hue correction circuit 40. However, another matrix circuit 59 is provided ahead of the color level correction circuit 60 so that the B output signal, instead of the B-Y output signal, may be supplied to the color level correction circuit.

The reason why the matrix circuit 59 is provided in addition to the matrix circuit 11 will now be described. As is well known, the chrominance signal fed to the demodulator circuit 9 is compressed in amplitude in comparison with the R-Y signal by 1/1.14 and by the ratio 1/2.03 in comparison with the B-Y signal. Thus the demodulator circuit 9 demodulates the R-Y output, which is multiplied 1.14, and the B-Y output, which is multiplied by 2.03, respectively. The level of the compressed VIR signal $S_I$ that is formed in a transmitter station and transmitted to television receivers is shown in FIG. 4A, while the level of the demodulated B-Y output which is multiplied by 2.03 becomes as shown in FIG. 4B, so that an output derived from the matrix circuit 11, that is, the B output signal, alone, becomes as shown in FIG. 4C.

When the amplitude of the chrominance reference signal $S_{VC}$ is equal to that of the burst signal $S_B$, the level of the B-Y and Y matrix output during the chrominance reference signal $S_{VC}$ should be equal to the level thereof during the luminance reference signal $S_{VY}$. Therefore, if the B output from the matrix circuit 11 wherein the B-Y signal is multiplied by 2.03 as shown in FIG. 4C were fed to the correction circuit 60 with the level of signal $S_{VY}$ being set as the reference level, proper color adjustment would not be achieved.

For this reason, the matrix circuit 59 is provided in which the B-Y output signal and the Y output signal are mixed together in a predetermined ratio to form a B' output signal. This B' output signal is shown in FIG. 4D in which the level of signal $S_{VC}$ is equal to that of signal $S_{VY}$ when the amplitude of the chrominance reference signal $S_{VC}$ is equal to that of the burst signal $S_B$. Thereafter, the B' output signal is supplied to a second comparator circuit 53 and a second holding circuit 50, which, together, form the correction circuit 60.

Figure 4A:
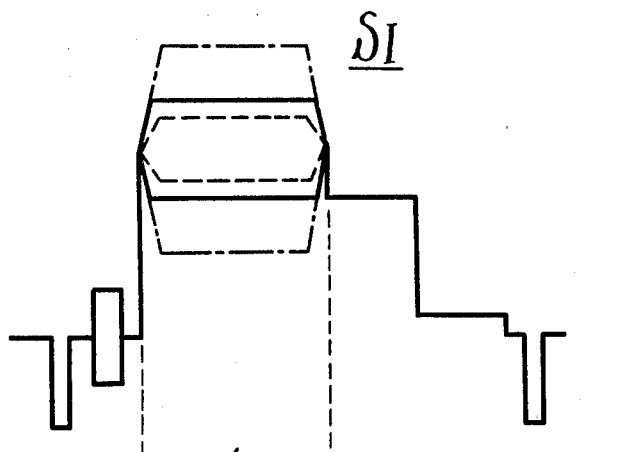
FIGS. 4A to 4D are waveform diagrams used to explaining the color level adjusting operation of the circuit in FIG. 2.
Figure 4B:
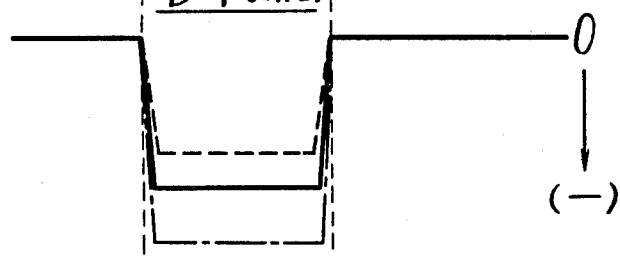
Figure 4C:
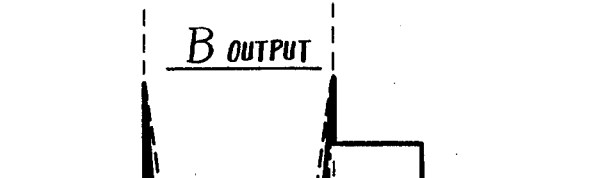
Figure 4D:
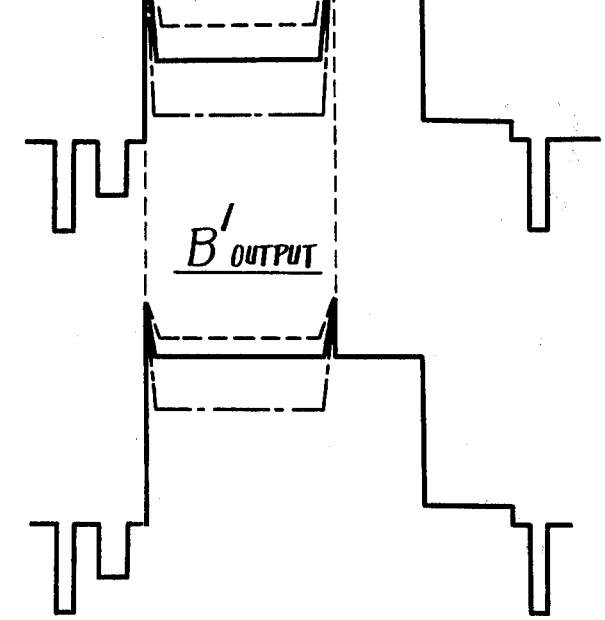

When the amplitude of the chrominance reference signal $S_{VC}$ is varied, as shown in FIG. 4A by a dotted line or a dash-chain line, the level of the B' output signal is changed accordingly, as shown in FIG. 4D by a dotted or a dash-chain line. Therefore, in the same manner as in the hue correction circuit 40, the second pulse $G_2$ is used to gate a second gate circuit 51 in the hold circuit 50 during the luminance reference portion $S_{VY}$ of the VIR signal $S_I$ to transfer the level of the signal $S_{VY}$ to a capacitor 52 to be held therein as the reference level during the next vertical interval. The stored reference level is applied to the comparator circuit 53 to be compared with the B' output signal appearing after the lapse of the next vertical interval. Then its output signal representing the compared value is supplied through a second sample-and-hold circuit 54 to the color level adjusting circuit 39, thus centering the color level about the normal flesh tint. A variable resistor 55 is provided for color saturation adjustment and a signal switching circuit 56 is provided to switch between automatic and manual control in the same manner as the signal switching circuit 36.

In the color correction circuit consisting of the hue correcting circuit 40 and the color level correcting circuit 60, the zero reference level is supposed to be held in the respective capacitor 32 and 52 for almost a complete vertical interval. The output voltage thus held is compared with the R-Y output signal or the B' output signal to obtain the compared output value.

However, the capacitors 32 and 52 may be partially discharged during a vertical interval. If that happens, accurate color correction signals cannot be derived through the comparator circuits 33 and 53 or the sample-and-hold circuit 34 and 54.

Figure 5:
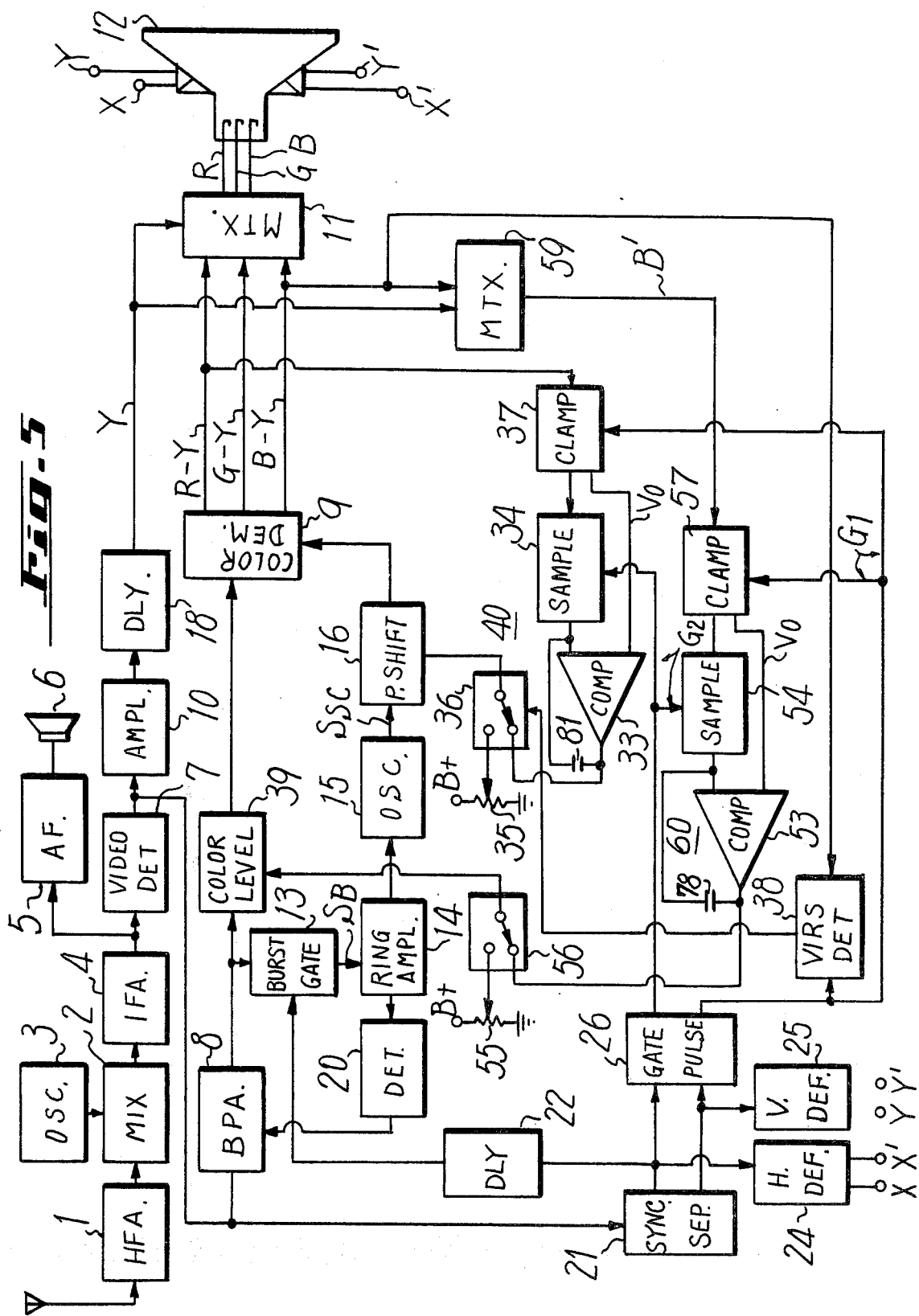
FIG. 5 is a block diagram showing one example of a color television receiver including a color correction circuit according to this invention.

FIG. 5 shows one example of a circuit that incorporates the present invention. Elements corresponding to those in FIG. 2 are identified by the same reference numerals and, for clarity, FIG. 5 will be described in conjunction with FIG. 6, which shows some of the key elements in greater detail.

Figure 6:
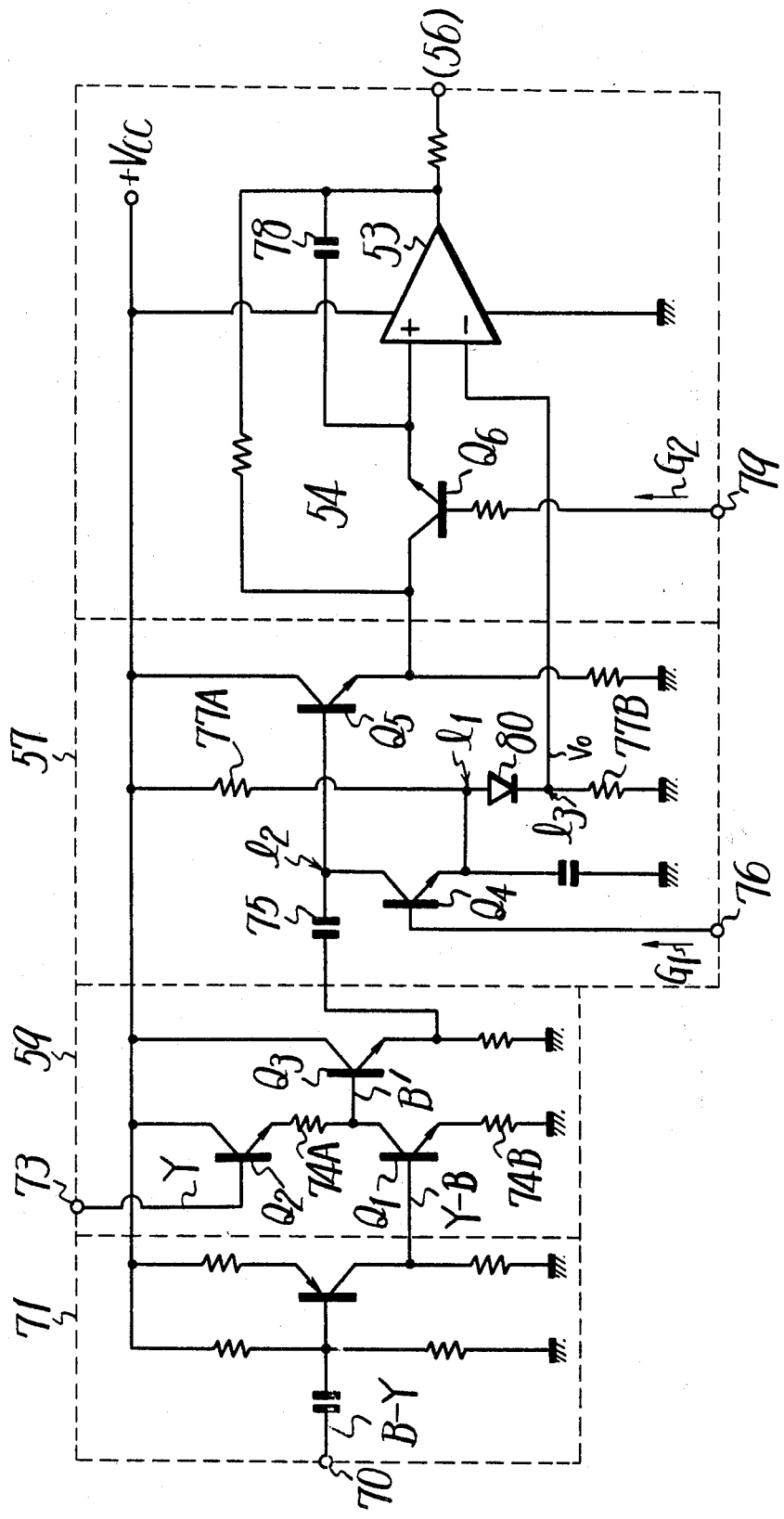
FIG. 6 is a circuit diagram showing one example of the main part of the color correction circuit shown in FIG. 5.

The color level correction circuit 60' in FIG. 5 is provided with a clamping circuit 57, which is one of the elements shown in greater detail in FIG. 6. A clamping voltage $V_0$ used in the clamping circuit is also supplied to the comparator 53 as a reference voltage, and the output of the clamping circuit 57 is supplied to the comparator circuit 53 as a comparison voltage through a sampling circuit 54. The compared output voltage from the comparator 53 is applied across a holding capacitor 78 to be stored by the capacitor.

In FIG. 6, the B-Y signal is applied to an input terminal 70 of a phase, or polarity, inverter circuit 71. Inversion of the polarity of the B-Y signal results in producing the negative signal $-(B-Y)$, or Y-B, at the output of the circuit 71, as indicated in FIG. 6.

The signal Y-B is applied to the base input terminal of a transistor $Q_1$, which is part of the matrix circuit 59 that also includes a second transistor $Q_2$. The luminance signal Y is connected to the base of the transistor $Q_2$ and is combined with the B-Y signal by virtue of the fact that the emitter-collector circuits of the transistors $Q_1$ and $Q_2$ are connected in series with each other and with a pair of resistors 74A and 74B. Specifically, the collector of the transistor $Q_2$ is connected to the positive power supply terminal and the emitter output electrode of that transistor is connected through the resistor 74A to the collector of the transistor $Q_1$. The emitter of transistor $Q_1$ is connected to ground through the resistor 74B to complete the series circuit.

Combining the luminance signal Y and the blue color difference chrominance signal B-Y in the series circuit just described leaves just the B' signal, the level of which is determined by the resistance ratio of the resistors 74A and 74B. The B' signal is applied through an emitter follower buffer amplifier comprising a transistor $Q_3$ to the clamping circuit 57.

The input circuit to the clamping circuit 57 includes a clamping capacitor 75 connected in series between the emitter output electrode of the buffer output transistor $Q_3$ of the matrix circuit 59 and the base of a transistor $Q_5$ connected as an emitter follower. The emitter-collector circuit of a clamping transistor $Q_4$ is connected in parallel with the input circuit of the transistor $Q_5$, and the first pulse $G_1$ (FIG. 3B) which coincides with the chrominance reference signal $S_{VC}$ in FIG. 3A, is applied to the base of the transistor $Q_4$ to make that transistor conductive for the duration of each pulse $G_1$, thereby clamping the base of the transistor $Q_5$ to the voltage level at the connection point $l_1$ at the emitter of the clamping transistor $Q_4$.

The emitter of the transistor $Q_4$ is connected to a source of a predetermined potential, which is a fraction of the power supply voltage and is obtained by means of a voltage divider comprising a pair of resistors 77A and 77B connected in series between the positive power supply terminal and ground. Thus, when the transistor $Q_4$ is made conductive, the voltage at the connection point $l_2$ between the collector of the transistor $Q_4$ and the base of the transistor $Q_5$ is clamped to the voltage at the connection point $l_1$ and is held at that voltage for the duration of the pulse $G_1$.

A diode 80 for correcting the clamped voltage is inserted between the connection point $l_1$ and the resistor 77B. The clamped voltage $V_0$ obtained at a connection point $l_3$ between the diode 80 and the resistor 77B is supplied to the comparator circuit 53 as its reference voltage.

The emitter output of the transistor $Q_5$ is applied to the sampling circuit 54 before being applied to the comparator circuit 53. The sampling circuit includes a transistor $Q_6$, the emitter-collector circuit of which is connected in series between the emitter output electrode of the buffer amplifier transistor $Q_5$ and the summing input terminal of the comparator 53. The base of the sampling transistor $Q_6$ is connected to an input terminal 79 through which is received the pulses $G_2$ (FIG. 7C) to make the transistor $Q_6$ conductive only for the duration of each of the pulses.

The diode 80 is provided so that its forward-biased voltage drop between the connection point $l_1$ and the connection point $l_3$ at the intersection of the diode, the resistor 77B, and the subtracting terminal of the comparator 53 corresponds to the base-emitter voltage $V_{BE}$ of the transistor $Q_5$. This voltage drop across the diode is necessary because, when the base of the transistor $Q_5$ is clamped to the voltage level at the connection point $l_1$, the output voltage at the emitter of the transistor $Q_5$ will be less by the value of $V_{BE}$. Thus, the voltage at the emitter of the transistor will be equal to the voltage $V_0$ during the clamping interval when the pulse $G_1$ is positive, and the voltage $V_0$ may be considered to be the clamping voltage.

The operation of the color level correction circuit 60 of this invention will next be described with reference to FIG. 7. The B' output (FIG. 7D) derived from the matrix circuit 59 is applied to the clamping circuit 57 to be clamped to a predetermined clamping voltage $V_0$ (FIG. 7E) by the first pulse $G_1$ (FIG. 7B) and the clamping voltage $V_0$ is supplied to the comparator circuit 53 as a reference voltage.

The output from the clamping circuit 57 is supplied to the collector of a transistor $Q_6$ in the sampling circuit 54 so that the signal level of the luminance reference portion can be sampled when the transistor $Q_6$ is made conductive by the second sampling pulse $G_2$ (FIG. 7C). As has just been described, the B' output is clamped to the value $V_0$ during the chrominance reference portion independent of the signal level of the chrominance reference portion. Therefore, when the signal level of the chrominance reference portion is varied as shown in FIG. 7B, the level of the sampled output during the laminance reference portion is inverted, as shown by the reversed locations of the dotted and dash-chain lines in FIG. 7E. In this case, the level difference between two reference portions in FIG. 7E is equal to that of the B' output shown in FIG. 7D.

Accordingly, the compared output is $V_1-V_0$, when their amplitudes are the same, or $V_2-V_0$ or $V_3-V_0$, when their amplitudes differ. This compared output can be used to adjust the color level by means of the gain-control amplifier 39 in the same manner as the prior art.

The hue adjustment operation is carried out in a manner closely analagous to the color level adjustment just described. The R-Y output of the color demodulator 9 is connected directly to a clamping circuit 37 similar to the clamping circuit 57 and is not first passed through a matrix circuit. The clamping circuit 37 is actuated by the same clamping pulse $G_1$(FIG. 7B) as the clamping circuit 57 so that the R-Y output from the color demodulator 9 is clamped during the chrominance reference portion of the VIR signal $S_I$. Then the second pulse $G_2$ (FIG. 7C) is used to sample the level of the output signal from the clamping circuit 37 in a sampling circuit 34 during the luminance reference portion of the VIR signal.

The output signal of the sampling circuit 34 and the clamping voltage $V_0$ are compared in a comparator 33, and the output level of the comparator is stored in a capacitor 78' similar to the mode of storage in the capacitor 78 in FIG. 6. This stored level is used to control the phase shifter 16 and thus the hue of the color image.

As described, in this invention the clamped output of the chrominance reference portion and the output of luminance reference portion obtained after clamping the chrominance reference portion are compared with each other to produce the compared output which is used to carry out color correction, either color level or hue, or both, so that accurate color correction can be always achieved.

It will be apparent that many modifications and variations may be effected without departing from the scope of the novel concepts of this invention.

What is claimed is:

1. A color correction circuit responsive to a VIR signal that includes a chrominance reference signal component during a first interval of time and a luminance reference signal during a second interval of time following the first interval, said circuit comprising:
   a chrominance circuit;
   clamping means for clamping to a predetermined voltage level a color demodulator signal derived from said chrominance reference signal component during said first interval;
   comparator means connected to said clamping means to receive the clamped output signal of said clamping means and to compare said clamped output signal during said second interval with said predetermined voltage level for producing a compared signal output; and
   means connected to said comparator means to be controlled by said compared signal output and connected to said chrominance circuit to correct the response thereof to chrominance signals.

2. A color correction circuit according to claim 1 comprising holding means connected to said comparator to hold said compared signal output.

3. A color correction circuit according to claim 1 comprising sampling means connecting said clamping means to said comparator means to transfer said output signal of said clamping means to said comparator means only during said second interval.

4. A color correction circuit according to claim 3 comprising storage means connected to the output of said comparator means to store said compared signal.

5. A color correction ciecuit according to claim 1 in which said chrominance circuit comprises a gain-controlled amplifier to amplify said chrominance signal, said gain-controlled amplifier comprising said means connected to said comparator means to be controlled by said compared signal.

6. A color correction circuit according to claim 1 in which said chrominance circuit comprises a color demodulator and said correction circuit comprises a matrix circuit connected to said color demodulator to derive a color difference signal therefrom and to a source of luminance signals to combine said luminance signals with said color difference signal to derive a color signal, said clamping circuit being connected to said matrix circuit to obtain the color signal derived therein as said color demodulated signal.

7. A color correction circuit according to claim 1 in which said chrominance circuit comprises a subcarrier generator and voltage-controlled phase shifting means connected thereto to shift the phase of the subcarrier, said phase shifting means comprising said means connected to said comparator means to be controlled by said compared signal.

8. A color correction circuit for a color television receiver responsive to a VIR signal having a chrominance reference component during a first interval and a luminance reference component during a second, succeeding interval, said correction circuit comprising:
   chrominance signal circuit means;
   luminance signal circuit means;
   a level detector connected to said chrominance signal circuit means for detecting the chrominance reference component;
   a matrix circuit connected to said luminance signal circuit means and said level detector for deriving a primary color signal during said VIR signal;
   a clamping circuit including a predetermined potential source and being connected to said matrix circuit for clamping the output of said matrix circuit to a predetermined level during said first interval;
   comparator means connected to said clamping circuit and said predetermined potential source for comparing said predetermined level and the clamped output of said clamping circuit during said second interval and providing a compared signal output; and
   means connected to said comparator and said chrominance signal circuit means for correcting the level of the output signal of said chrominance signal circuit means in accordance with said compared signal output to effect color saturation level correction.

9. A color correction circuit for a color television receiver responsive to a VIR signal having a chrominance reference component during a first interval and a luminance reference component during a second, succeeding interval, said correction circuit comprising:
   a chrominance signal processing circuit;
   a subcarrier oscillator supplied with burst signals;
   phase detector means connected to said chrominance signal processing circuit and to said subcarrier oscillator for detecting any phase difference between the chrominance signal and the output signal of said subcarrier oscillator;
   clamping circuit means including a source of a predetermined potential and connected to said phase detector means for clamping the output level of said phase detector means during said first interval to a predetermined level;
   comparator means connected to said clamping circuit means and said predetermined potential source for comparing said predetermined level and the clamped output of said clamping circuit means during said second interval and providing a compared signal output; and
   means connected to said comparator means and said subcarrier oscillator for correcting the phase of the output signal of the latter in accordance with said compared signal output, to effect hue correction.

* * * * *